Sept. 19, 1950 G. PRIPETON 2,522,637
CLEARANCE INDICATOR FOR AUTOMOBILES
Filed Nov. 19, 1948 2 Sheets-Sheet 1

INVENTOR.
GEORGE PRIPETON,
BY
McMorrow, Berman + Davidson
ATTORNEYS.

Sept. 19, 1950          G. PRIPETON          2,522,637
                 CLEARANCE INDICATOR FOR AUTOMOBILES
Filed Nov. 19, 1948                          2 Sheets-Sheet 2
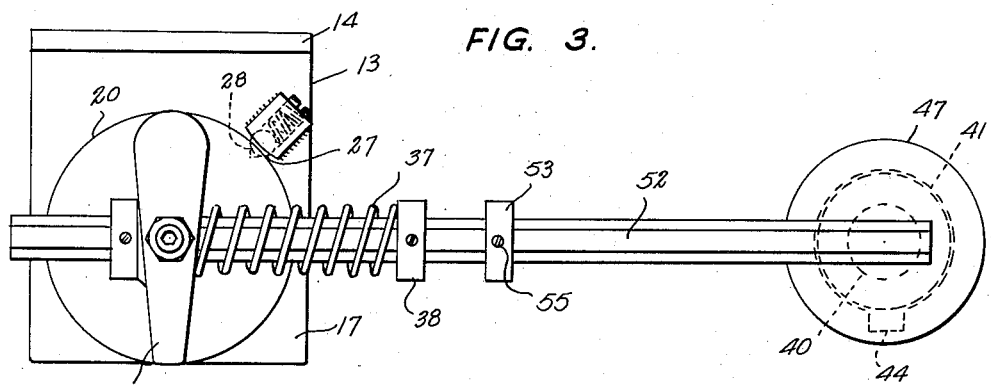
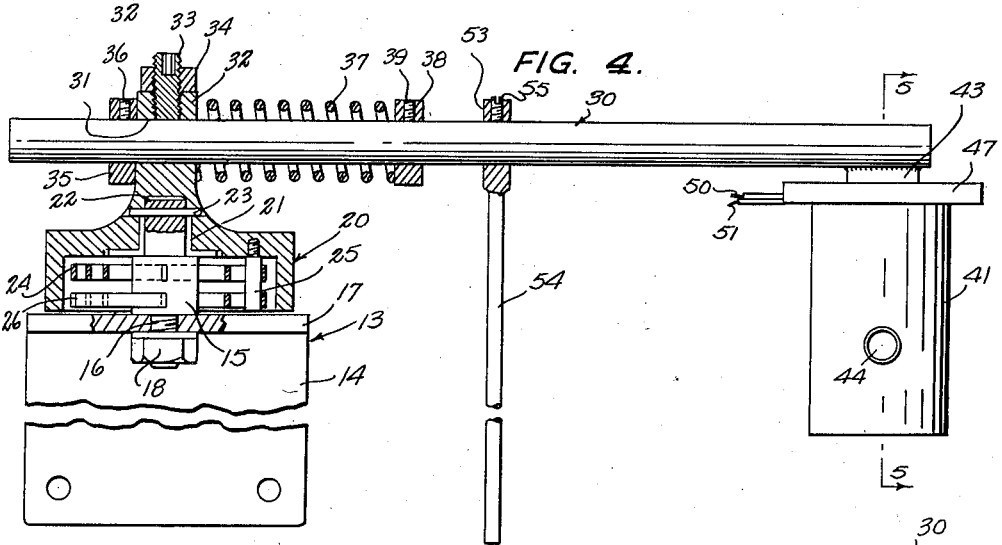
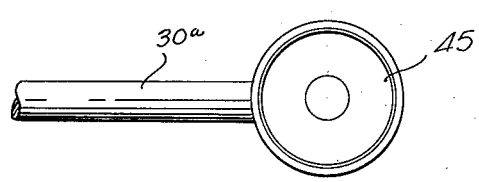
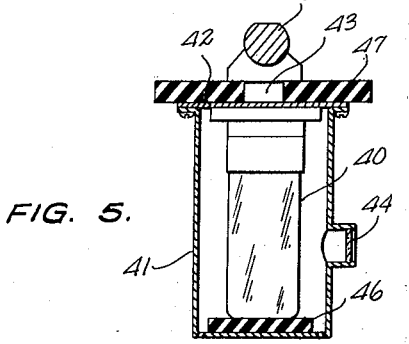
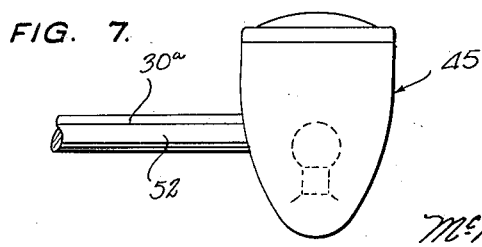
INVENTOR.
GEORGE PRIPETON,
BY
McMorrow, Berman + Davidson
ATTORNEYS.

Patented Sept. 19, 1950

2,522,637

UNITED STATES PATENT OFFICE 2,522,637

CLEARANCE INDICATOR FOR AUTOMOBILES

George Pripeton, Homestead, Pa.

Application November 19, 1948, Serial No. 60,931

3 Claims. (Cl. 177—311)

This invention relates to a clearance indicator for aiding in parking an automobile.

An object of the invention is the provision of a device attached to either side of an automobile for engagement with the curbing of a street or a parked vehicle for sounding an alarm as a warning to the operator that his automobile is too close to another vehicle or object and that further movement in the same direction will cause injury to not only his automobile but to the parked car, said device including an oscillatable lamp on the rear bumper concentrating light rays on an oscillatable photo-electric cell on the front bumper, contact of the lamp or cell with an object causing the light rays to be deflected away from the cell whereby a circuit is closed to an alarm.

A further object of the invention is the provision of a plurality of elements mounted rockably in pairs of each side of an automobile, each pair of elements including a photo-electric cell and a lamp adapted to concentrate light rays on the associated cell. Engagement with an object or other automobile by one of the elements causing said element to be rocked for cutting off the light rays from a lamp to the cell whereby instrumentalities are set automatically in operation for giving an alarm, said device also acting to warn the operator of a vehicle that he is too close to another vehicle or object when driving along a road bed.

The invention is best understood from a consideration of the following detailed description in connection with the accompanying drawings, nevertheless, it is to be borne in mind that the invention is not confined to the disclosure but is susceptible of such changes and modifications as shall define no material departure from the salient features of the invention as expressed in the appended claims.

In the drawings—

Figure 3 is a longitudinal plan view of an attaching means for the parking and driving eye, Figure 4 is a vertical section of the attaching means showing the electric eye attached thereto.

Figure 5 is a longitudinal vertical section of the electric eye taken along the line 5—5 of Figure 4, Figure 6 is a front view in elevation of a lamp, and Figure 7 is a plan view of the lamp, shown detached for directing light rays onto an electric eye.

Figure 1:
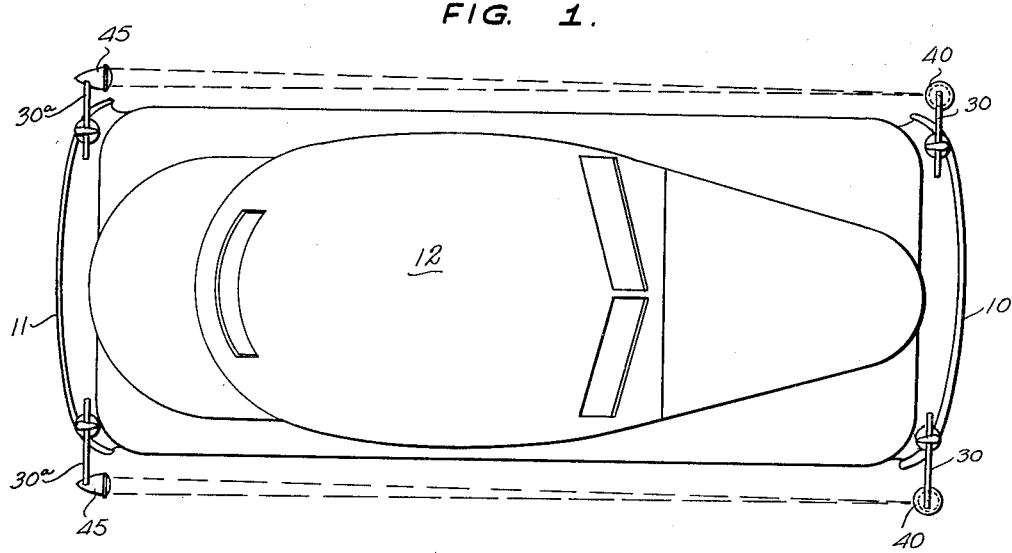
Figure 1 is a plan view of an automobile showing my driving and parking eye applied thereto.

Referring more particularly to the drawing, 10 and 11 designate respectively front and rear bumpers of an automobile 12. As shown in Figures 3 and 4, a bracket 13 has an attaching flange 14 which is adapted to be secured to an end of the front bumper 10. An axle 15 has a reduced threaded portion 16 received by an opening in a horizontal flange 17 of the bracket. A nut 18 screwed onto the threaded portion secures the axle against rotation. An inverted cup-shaped member 20 has an axial pocket 21 receiving the upper end of the axle which is provided with an annular groove 22 for the reception of the inner ends of pins 23 to permit rocking of the cup in the axle while retaining the cup on said axle. A right hand coil spring 24 has one end secured to the axle 15 while the other end is attached to a pin 25 threaded into a passage in the cup-shaped member 20. A left hand coil spring 26 has its ends connected between the axle and the pin 25. These springs work in opposition to each other to maintain the cup in a predetermined position. A detent 27 carried by the bracket 13 engages a notch 28 in the member 20 to insure the proper position of said member as will be explained presently.

A rockable rod 30 has one end received by a passage 31 in a vertical post or extension 32 on the top of the member 20. The extension is tapered transversely as shown in Figure 3. A set screw 33 and a nut 34 are adjusted to permit the rod to slide long its longitudinal axis but prevents turning of the rod. A collar 35 engages one face of the extension and is fixed to the rod 30 by a set screw 36. A coil spring 37 embracing said rod is pressed against the extension by the adjustment of a collar 38 along the rod to return the rod to its original position in case it is deflected along its axis. A set screw 39 fixes the collar in the place.

An electric eye in the form of a conventional photo-electric cell, generally designated by the numeral 40 is mounted in a casing 41 having the upper end attached to a cover plate 42 rigid with a projection 43 on the outer free end of the rod 30. The casing has a window 44 for the admission of light from a lamp 45. The cell is connected in any approved manner with the plate 42. An elastic cushion 46 such as rubber supports the lower end of the cell. A rubber washer 47 is held in place by a shoulder on the projection 43 and the plate 42 and extends sufficiently beyond the periphery of said plate for engagement with an object at one side of the fenders of a driven automobile so that the rod will be rocked angularly or deflected axially. Wires 50 and 51 extend from the cell.

The lamp 45 is supported at each end of the rear bumper 11 by rods 30a in the same manner as are the cells 40 at the ends of the front bumper 10. All of the rods 30 and 30a have a flat upper portion 52 for engagement with the various set screws for retaining the collars in place and permitting the rod 30 to slide longitudinally without rotating on its longitudinal axis, said collars including a collar 53 received by each rod and rigidly supporting a depending arm 54. The free end of the arms are in positions for engagement with the curbing along each side of a street to cause rocking or sliding of the various rods. A set screw 55 positions adjustably the collar along the rod.

Figure 2:
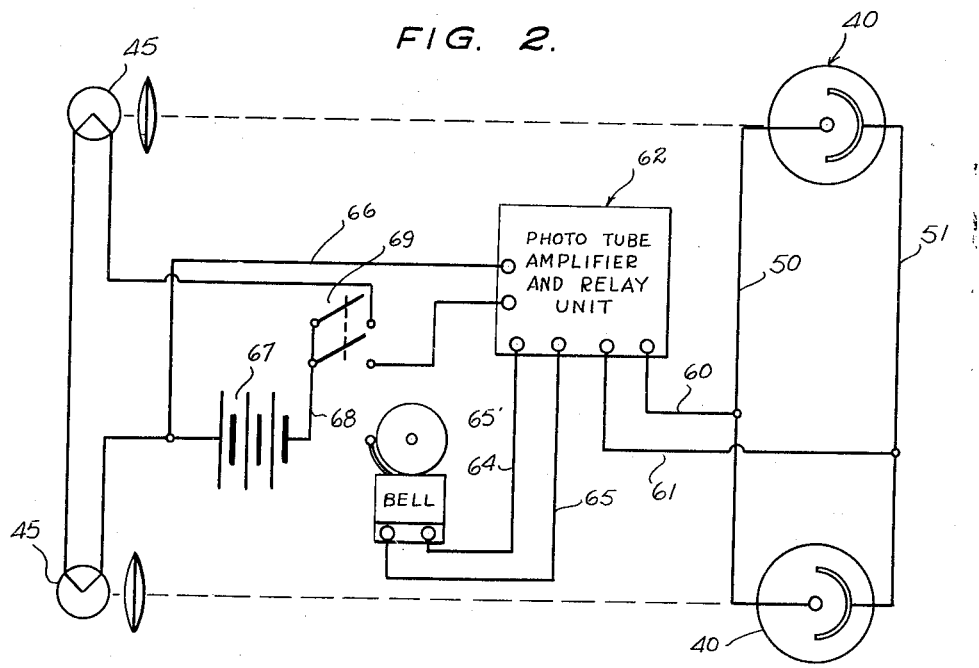
Figure 2 shows more or less diagrammatically the electric circuits for the parking eye.

Referring more particularly to Figure 2, it will be seen that wires 60 and 61 connect the respective wires 50 and 51 with an amplifier and relay unit 62 carried within the automobile. Wires 63 and 64 connect said amplifier with a bell 65 also mounted in the vehicle. A wire 66 is connected between the amplifier and a source of current 67 while a wire 68 provides a connection between said source of current and a two way switch generally designated by the numeral 69. The switch is closed manually when it is desired to park the car or when driving along a road bed. At this time the circuits to the lamps, the cells 40 and the amplifier are closed. However, the usual relay-operated switch in the unit 62 remains open until the light rays from the lamps 45 fail to affect the cells.

The operation of my device is as follow—When it is desired to park, the switch 69 is closed and the lamps 45 are illuminated for concentrating rays on the energized photo-electric cells 40. At this time, the usual conventional automatic relay-operated switch in the unit 62 is open. If the operator of the vehicle 12 drives his car close enough to a parked car or object so that the rubber washer 47 will engage said car, the rod 30 adjacent the car will be rocked angularly or deflected axially and the photo-cell 40 carried by said rod will be moved out of the path of the light rays from a lamp and the relay operated switch will be closed to cause ringing of the bell 65.

If the operator of the vehicle drives the vehicle too close to the curbing, the arm 54 will engage the curbing and rock and slide one of the rods 30 at the right hand side of the vehicle. The cell 40 on said rod will be moved out of alignment with the light rays from the lamps 45 and cause ringing of the bell 65.

In a like manner when the lamps engage an object, one of the rods 30a will be rocked for cutting off the light rays to its associated cell. The cutting off of the light rays from a lamp will cause the relay-operated switch in the unit 62 to close so that the alarm 65 will be actuated. Further, should an object pass between the lamp and the photo-electric cell without making contact with either, and interrupt the light to the photo-electric cell, the alarm will also ring.

What I claim:

1. A clearance indicating device for automobiles, comprising a pair of mounting brackets to be secured to the automobile adjacent to one side thereof and near its front and rear ends, substantially vertical non-rotatable axles secured to the mounting brackets and projecting above the same, rotatable support members mounted upon the axles and having openings in their bottoms for receiving the axles, spring means mounted within the openings of the support members and connecting the support members and axles and serving to yieldingly resist rotation of the support members in both directions, the support members projecting above the tops of the axles and being provided with substantially horizontal bores, substantially horizontal rods mounted within the horizontal bores and adapted to shift longitudinally therein, means connecting the rods and support members and preventing rotation of the rods, springs connected with the rods and support members for urging the rods longitudinally in one direction, a source of light secured to one of said rods near its outer end and disposed laterally outwardly of the adjacent side of the automobile and projecting a beam of light toward the other rod, a light sensitive cell secured to the other rod near its outer end and disposed laterally outwardly of the adjacent side of the automobile and positioned to receive the beam of light from the light source, and electrical circuit means connected with the source of light and light sensitive cell and including a signal, the signal operating when either the source of light or light sensitive cell engages an obstruction which shifts either rod longitudinally inwardly or swings either rod horizontally about either axle.

2. A clearance indicating device for automobiles, comprising a pair of mounting brackets to be secured to the automobile adjacent to one side thereof and near its front and rear ends, substantially vertical non-rotatable axles secured to the mounting brackets and projecting above the same, rotatable support members mounted upon the axles, spring means connecting the support members and axles and serving to resist rotation of the support members in both directions, the support members projecting above the axles and having substantially horizontal bores, substantially horizontal rods mounted within the horizontal bores and adapted to shift axially therein, means connecting the rods and support members to prevent the rotation of the rods, springs connected with the rods and support members for urging the rods longitudinally in one direction, a lamp secured to one of the rods near its outer end and disposed laterally outwardly of the adjacent side of the automobile and projecting a beam of light longitudinally of the automobile and toward the other rod, a housing secured to the other rod near its outer end and disposed laterally outwardly of the adjacent side of the automobile and having a window to receive the beam of light, a light sensitive cell mounted within the housing adjacent to the window, and an electrical circuit carried by the automobile and connected with the lamp and light sensitive cell and including an audible signal, the signal operating when either the lamp or housing strikes an obstruction for shifting either rod axially or swinging it horizontally.

3. A clearance indicating device for automobiles comprising a pair of fixed supports secured to the automobile near one side thereof and near its front and rear ends, support members journaled upon the fixed supports for rotation about substantially vertical axes, spring means connecting the support members and fixed supports and serving to resist rotation of the support members in both directions, substantially horizontal rods slidably secured to the support members and adapted to shift longitudinally, means connected with the rods for preventing rotation of the rods about their longitudinal axes, springs connected with the rods for urging the rods longitudinally in one direction, a lamp secured to one of the rods near its outer end and disposed laterally outwardly of the adjacent side of the automobile and projecting a beam of light longitudinally of the automobile and toward the other rod, a light sensitive cell secured to the other rod near its outer end and disposed laterally outwardly of the adjacent side of the automobile and positioned to receive the beam of light, and electrical circuit means connected with the lamp and light sensitive cell and including a signal, the signal operating when either the lamp or light sensitive cell engages an obstruction which shifts either rod longitudinally inwardly or swings it horizontally in either direction.

GEORGE PRIPETON.

REFERENCES CITED

The following references are of record in the file of this patent:

UNITED STATES PATENTS

| Number | Name | Date |
|---|---|---|
| 2,261,190 | Shropshire | Nov. 4, 1941 |
| 2,317,652 | Toney | Apr. 27, 1943 |
| 2,440,587 | Krall | Apr. 27, 1948 |